(12) United States Patent
Kim et al.

(10) Patent No.: US 9,158,163 B2
(45) Date of Patent: Oct. 13, 2015

(54) DISPLAY APPARATUS

(71) Applicants: Sung Hyuk Kim, Yongin (KR); Jin Suk Park, Yongin (KR)

(72) Inventors: Sung Hyuk Kim, Yongin (KR); Jin Suk Park, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 106 days.

(21) Appl. No.: 13/942,891

(22) Filed: Jul. 16, 2013

(65) Prior Publication Data

US 2014/0022498 A1   Jan. 23, 2014

(30) Foreign Application Priority Data

Jul. 20, 2012   (KR) .................. 10-2012-0079513

(51) Int. Cl.
  *G02F 1/1335* (2006.01)
  *G02F 1/1333* (2006.01)
  *G02F 1/1343* (2006.01)
  *G02F 1/1337* (2006.01)

(52) U.S. Cl.
  CPC .... *G02F 1/134309* (2013.01); *G02F 1/133707* (2013.01); *G02F 1/133514* (2013.01); *G02F 2001/134318* (2013.01)

(58) Field of Classification Search
  CPC .............. G02F 1/133707; G02F 1/133753; G02F 1/1337; G02F 2001/134318; G02F 1/134309; G02F 1/133514
  USPC .......................... 349/106, 110, 111
  See application file for complete search history.

(56) References Cited

U.S. PATENT DOCUMENTS

| | | | | |
|---|---|---|---|---|
| 6,597,423 B1* | 7/2003 | Oima et al. | ........... | 349/139 |
| 2001/0048494 A1* | 12/2001 | Koma | ........... | 349/110 |
| 2006/0072064 A1* | 4/2006 | Kim | ........... | 349/187 |
| 2006/0103792 A1* | 5/2006 | Lee et al. | ........... | 349/113 |
| 2006/0109411 A1* | 5/2006 | Kwon | ........... | 349/143 |
| 2010/0149448 A1* | 6/2010 | Kim | ........... | 349/42 |
| 2010/0193946 A1* | 8/2010 | Suzuki et al. | ........... | 257/737 |
| 2010/0296034 A1* | 11/2010 | Kim | ........... | 349/110 |
| 2011/0007252 A1* | 1/2011 | Hashimoto et al. | ........... | 349/114 |
| 2013/0300993 A1* | 11/2013 | Egami | ........... | 349/123 |

\* cited by examiner

*Primary Examiner* — Richard Kim
*Assistant Examiner* — Ryan Crockett
(74) *Attorney, Agent, or Firm* — Lee & Morse, P.C.

(57) ABSTRACT

A display apparatus has a first display substrate including a pixel electrode, and a second display substrate facing the first display substrate and including a pixel region. The second display substrate includes an insulating substrate, a concave surface compensation pattern that is in the pixel region and that is on the insulating substrate, an overcoating layer covering the concave surface compensation pattern, and a common electrode that is on the overcoating layer and that has an aperture therein at a location corresponding to the concave surface compensation pattern.

22 Claims, 11 Drawing Sheets

DISPLAY APPARATUS

CROSS-REFERENCE TO RELATED APPLICATION

This application claims priority under 35 U.S.C. §119 to Korean Patent Application No. 10-2012-0079513 filed on Jul. 20, 2012, in the Korean Intellectual Property Office, the contents of which is incorporated herein by reference in its entirety.

BACKGROUND

Liquid crystal displays (LCDs) are applied to various devices including televisions, monitors, notebooks as well as mobile phones, personal data assistants (PDAs), and smart phones.

SUMMARY

Embodiments may be realized by providing a display apparatus that has a first display substrate including a pixel electrode, and a second display substrate facing the first display substrate and including a pixel region. The second display substrate includes an insulating substrate, a concave surface compensation pattern formed on the insulating substrate and located in the pixel region, an overcoating layer covering the concave surface compensation pattern, and a common electrode formed on the overcoating layer and having an aperture formed at a location corresponding to the concave surface compensation pattern.

The concave surface compensation pattern may have substantially a same shape as the aperture. A surface of the overcoating layer may protrude through the aperture. The surface of the overcoating layer protruding through the aperture may protrude further than a surface of the common electrode defining the aperture. A surface of the concave surface compensation pattern may include protrusions and recesses.

The display apparatus may include a light-blocking pattern arranged on the insulating substrate and arranged along boundaries of the pixel region. The concave surface compensation pattern may have substantially a same thickness as the light-blocking pattern.

The concave surface compensation pattern may include a plurality of concave surface compensation sub-patterns that are separated from each other. The concave surface compensation pattern may be an island-shaped pattern. A surface of the overcoating layer may be exposed through the aperture and the surface may include an uneven portion.

The display apparatus may include a color filter that is in the pixel region and that covers the concave surface compensation pattern. The overcoating layer may be on the color filter. The concave surface compensation pattern may be made of a color filter material having a different color from a color of the color filter in the pixel region.

The display apparatus may include a color filter that is in the pixel region and that is interposed between the insulating substrate and the concave surface compensation pattern. The concave surface compensation pattern may be made of a color filter material having a different color from a color of the color filter in the pixel region.

The common electrode may be sloped toward the aperture. The display apparatus may include a liquid crystal layer between the first display substrate and the second display substrate.

Embodiments may also be realized by providing a display apparatus that has a first display substrate including a pixel electrode, a second display substrate facing the first display substrate and including a pixel region, and a liquid crystal layer interposed between the first display substrate and the second display substrate. The second display substrate includes an insulating substrate, a first light-blocking pattern formed on the insulating substrate and formed along boundaries of the pixel region, a second light-blocking pattern formed on the insulating substrate and located in the pixel region, a color filter covering the second light-blocking pattern and occupying the pixel region, an overcoating layer formed on the color filter, and a common electrode formed on the overcoating layer and having an aperture formed at a location corresponding to the second light-blocking pattern.

The second light-blocking pattern may have substantially a same shape as the aperture. A surface of the overcoating layer may protrude through the aperture. The first light-blocking pattern and the second light-blocking pattern may be simultaneously patterned structures formed in a same process. The first light-blocking pattern and the second light-blocking pattern may have substantially a same thickness. The common electrode may be sloped toward the aperture.

BRIEF DESCRIPTION OF THE DRAWINGS

Features will become apparent to one of ordinary skill in the art by describing in detail exemplary embodiments thereof with reference to the attached drawings, in which.

DETAILED DESCRIPTION

Embodiments may be understood more readily by reference to the following detailed description of exemplary embodiments and the accompanying drawings. Embodiments may, however, be embodied in many different forms and should not be construed as being limited to the exemplary embodiments set forth herein. Rather, these embodiments are provided so that this disclosure will be thorough and complete and will fully convey exemplary implementations to those skilled in the art.

It will be understood that when an element or layer is referred to as being "on" another element or layer, the element or layer can be directly on another element or layer or intervening elements or layers may be present. Like numbers refer to like elements throughout.

It will be understood that, although the terms first, second, third, etc., may be used herein to describe various components, these components should not be limited by these terms. These terms are only used to distinguish one component from another component. Thus, a first component discussed below could be termed a second component without departing from the teachings.

Embodiments will now be described more fully with reference to the accompanying drawings, in which exemplary embodiments are shown. A liquid crystal display (LCD) will hereinafter be described as an example of a display apparatus. However, the display apparatus according to embodiments is not limited to the LCD type display. Other display apparatuses such as an organic light-emitting diode (OLED) display and a plasma display panel (PDP) are also applicable without departing from the spirit of the embodiments.

Figure 1:
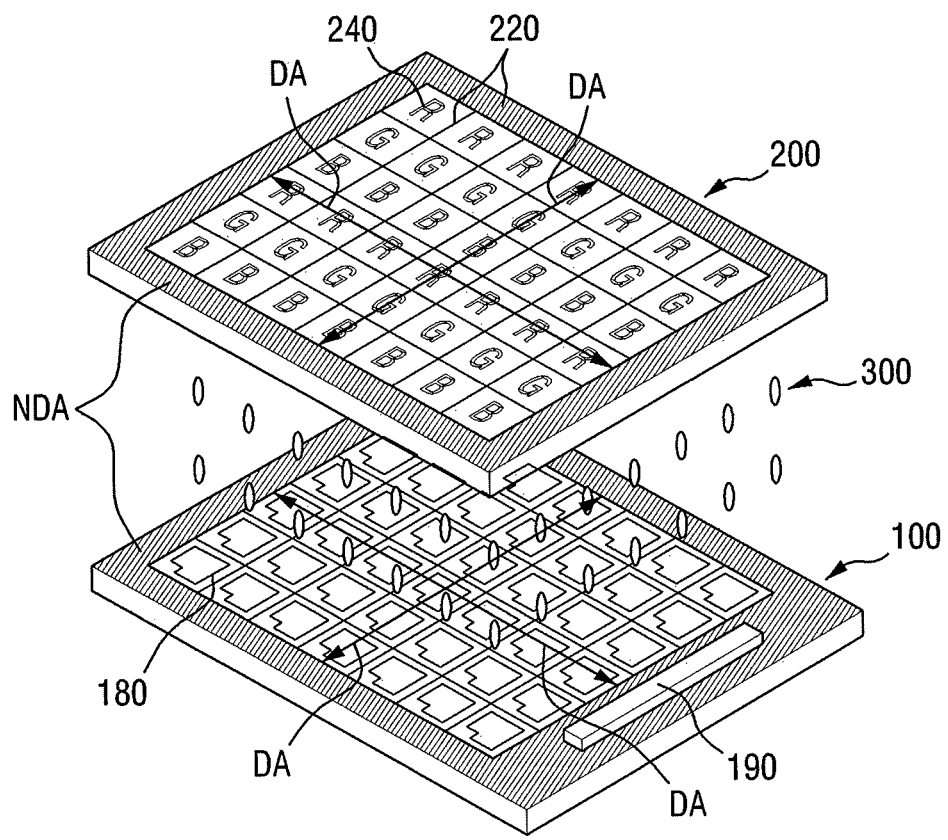
FIG. 1 is a schematic exploded perspective view of a display apparatus according to an exemplary embodiment.
Figure 2:
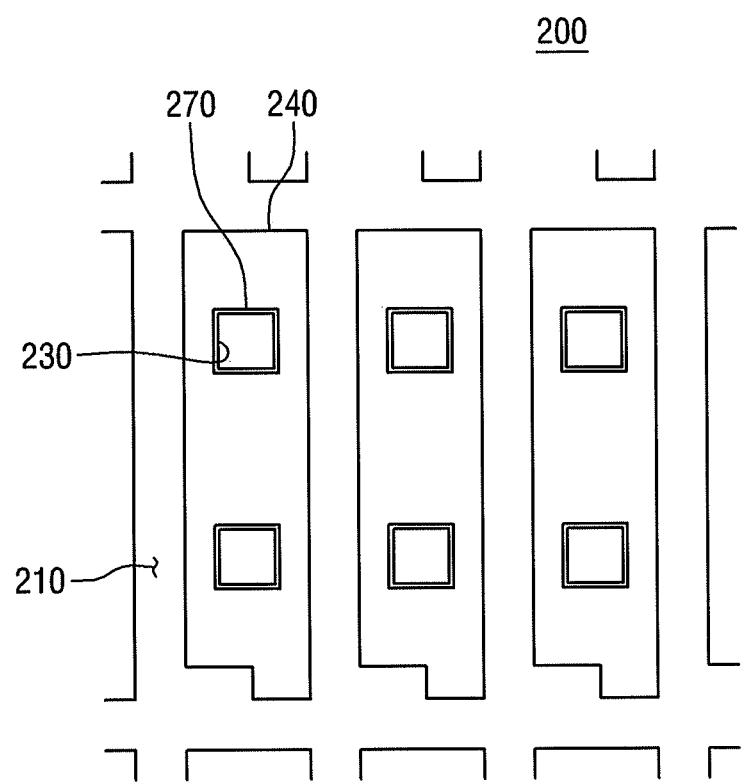
FIG. 2 is a layout view of a second display substrate of the display apparatus shown in FIG. 1.
Figure 3:
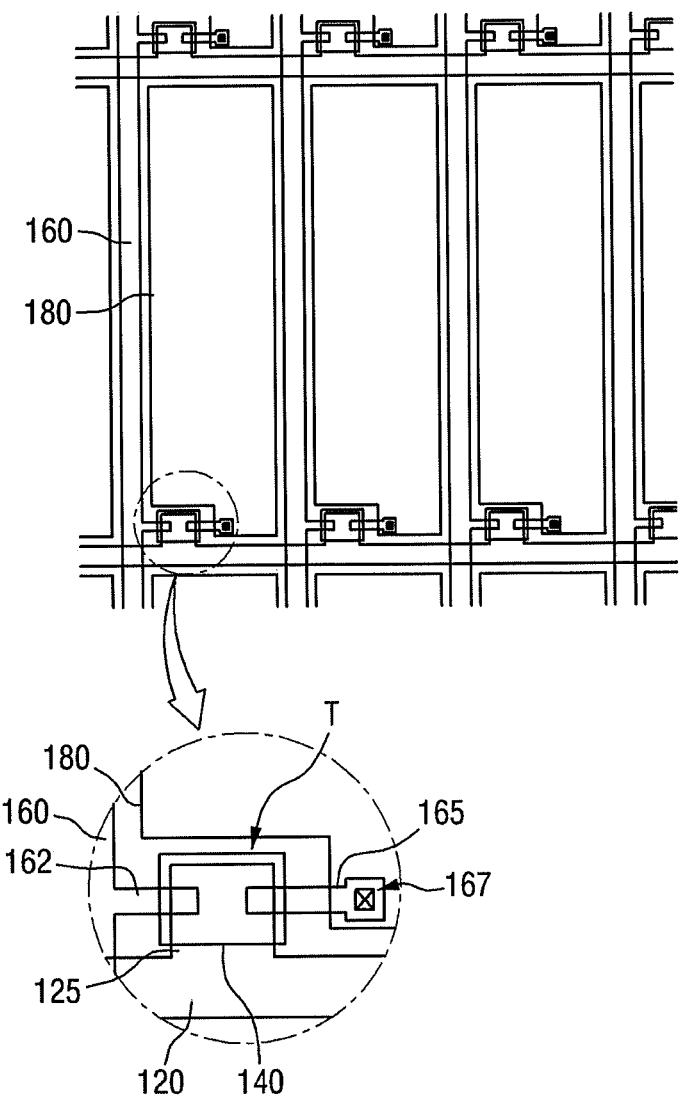
FIG. 3 is a layout view of a first display substrate of the display apparatus shown in FIG. 1.
Figure 4:
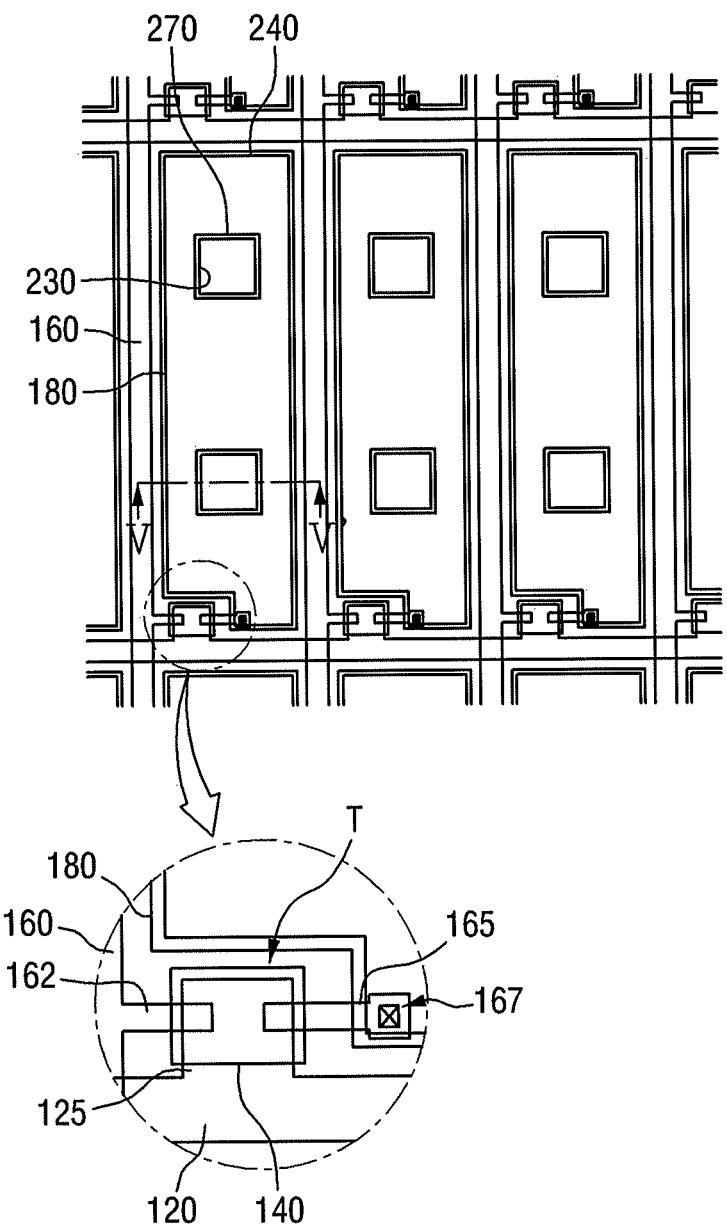
FIG. 4 is a layout view obtained by combining FIGS. 2 and 3.
Figure 5:
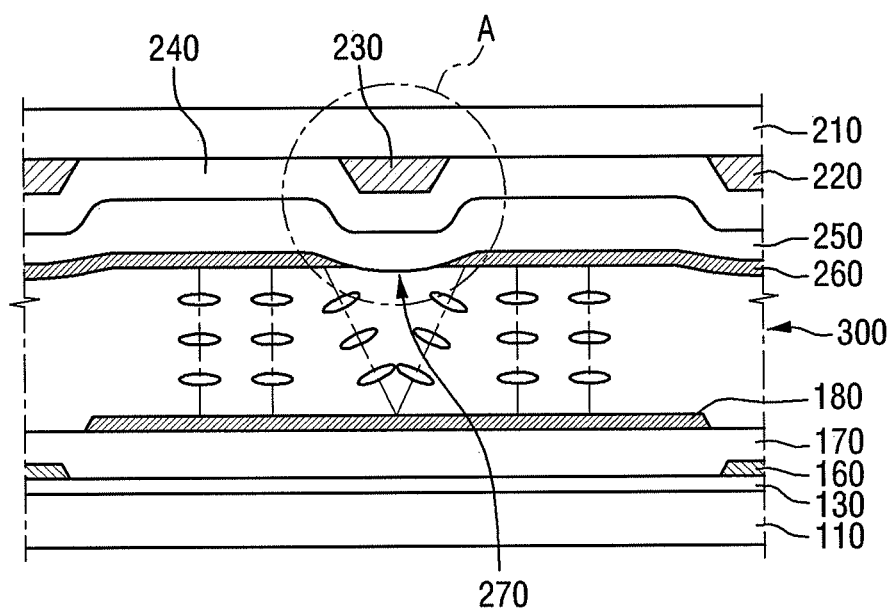
FIG. 5 is a cross-sectional view taken along the line V-V' of FIG. 4.

FIG. 1 is a schematic exploded perspective view of a display apparatus 500 according to an exemplary embodiment. FIG. 2 is a layout view of a second display substrate 200 of the display apparatus 500 shown in FIG. 1. FIG. 3 is a layout view of a first display substrate 100 of the display apparatus 500 shown in FIG. 1. FIG. 4 is a layout view obtained by combining FIGS. 2 and 3. FIG. 5 is a cross-sectional view taken along the line V-V' of FIG. 4.

Referring to FIGS. 1 through 5, the display apparatus 500 may include the first display substrate 100, the second display substrate 200 which faces the first display substrate 100, and a liquid crystal layer 300 which is interposed between the first display substrate 100 and the second display substrate 200.

Each of the first and second display substrates 100 and 200 includes a display area DA and a non-display area NDA. A plurality of pixels arranged in a matrix may be defined in the display area DA.

A pixel electrode 180 may be disposed in each pixel of the display area DA of the first display substrate 100. The pixel electrode 180 may receive a data voltage via a thin-film transistor (TFT) T. The pixel electrode 180 generates an electric field together with a common electrode 260 on the second display substrate 200, thereby controlling an alignment direction of liquid crystal molecules of the liquid crystal layer 300 interposed between the pixel electrode 180 and the common electrode 260.

In the non-display area NDA of the first display substrate 100, a driving unit which provides a gate driving signal, a data driving signal, etc. to each pixel of the display area DA may be disposed.

In the display area DA of the second display substrate 200, a color filter 240 may be formed in each pixel. The color filters 240 may include red, green and blue filters 240. For example, the red, green, and blue filters 240 may be arranged alternately. A light-blocking pattern 220 may be disposed at a boundary between, e.g., every two color filters 240. The light-blocking pattern 220 may also be disposed in the non-display area NDA of the second display substrate 200. The common electrode 260 formed as a single continuous layer may be disposed on the whole surface of the display area DA, regardless of the pixels.

The first display substrate 100 and the second display substrate 200 may be sealed together by a sealing member (not shown) such as a sealant. The sealing member may be located on the periphery of the first display substrate 100 and the second display substrate 200, that is, on the non-display area NDA.

The structure of each pixel of the display apparatus 500 will now be described in greater detail.

Referring to FIGS. 3, 4 and 5, the first display substrate 100 uses a first substrate 110 as a base substrate. The first substrate 110 may be an insulating substrate. A plurality of gate wirings 120 and a plurality of data wirings 160 may be formed on the first substrate 110. Each of the gate wirings 120 may extend in a horizontal direction along horizontal boundaries of the pixels, and each of the data wirings 160 may extend in a vertical direction along vertical boundaries of the pixels. A gate insulating film 130 may be formed between the gate wirings 120 and the data wirings 160 to, e.g., prevent short circuits at intersections of the gate wirings 120 and the data wirings 160.

The TFT T, which is a switching device, may be formed near each of the intersections of the gate wirings 120 and the data wirings 160. The pixel electrode 180 may be disposed in each of pixel regions defined by the gate wirings 120 and the data wirings 160. A gate electrode 125 which is a control terminal of the TFT T may be connected to a gate wiring 120, a source electrode 162 which is an input terminal of the TFT T may be connected to a data wiring 160, and a drain electrode 165 which is an output terminal of the TFT T may be electrically connected to the pixel electrode 180 by a contact hole 167 formed in a passivation film 170. A channel of the TFT T may be formed by a semiconductor layer 140. The semiconductor layer 140 may overlap the gate electrode 125. The source electrode 162 and the drain electrode 165 may be separated from each other with respect to the semiconductor layer 140.

When the gate electrode 125 receives a gate-on signal, a channel is formed in the semiconductor layer 140. Accordingly, the TFT T is turned on, and the drain electrode 165 receives a data signal from the source electrode 162 and transmits the data signal to the pixel electrode 180.

Referring to FIGS. 2, 4 and 5, the second display substrate 200 uses a second substrate 210 as a base substrate. The second substrate 210 may be an insulating substrate. The light-blocking pattern 220 and a concave surface compensation pattern 230 may be formed on the second substrate 210.

The light-blocking pattern 220 may be formed along the boundaries of the pixels to expose the pixel regions. For example, the light-blocking pattern 220 may be formed to have a lattice pattern.

The light-blocking pattern 220 may be made of a material that blocks the transmission of incident light. A light-blocking effect may be achieved by reflecting or absorbing incident light. For example, the light-blocking pattern 220 may be made of a metal (such as chrome) with high reflectivity to have the light-blocking effect. In another example, the light-blocking pattern 220 may be made of an organic film (hereinafter, referred to as a 'black organic film') that contains a material such as black dye or pigment. Thus, the light-blocking pattern 220 may have the light-blocking effect by absorbing most of incident light. In some embodiments, the light-blocking pattern 220 may be made of a stack of a metal film and a black organic film.

The concave surface compensation pattern 230 may be disposed in each pixel. The concave surface compensation pattern 230 fills at least part of a concave groove that may be formed by an aperture 270 of the common electrode 260, thereby removing the concave groove or reducing a depth of the concave groove. The concave surface compensation pattern 230 may have substantially the same shape as the corresponding aperture 270 of the common electrode 260. In FIGS. 2 and 4, two island-shaped concave surface compensation patterns 230 are formed in one pixel. However, the shape and position of the concave surface compensation pattern 230 may vary according to the aperture 270 of the common electrode 260 which will be described later.

The concave surface compensation pattern 230 may be formed on the same layer as the light-blocking pattern 220. In an exemplary embodiment, like the light-blocking pattern 220, the concave surface compensation pattern 230 may have a light-blocking function. For example, the concave surface compensation pattern 230 may be made of a metal, a black organic film, or a stack of the metal and the black organic film. Further, the concave surface compensation pattern 230 may be made of the same material as the light-blocking pattern 220. If the concave surface compensation pattern 230 has the light-blocking function, the light-blocking pattern 220 can be referred to as a first light-blocking pattern, and the concave surface compensation pattern 230 can be referred to as a second light-blocking pattern.

In some embodiments, the concave surface compensation pattern 230 may have substantially the same thickness as the light-blocking pattern 220. An exemplary thickness of the concave surface compensation pattern 230 may be approximately 1 μm.

According to a certain embodiment, the concave surface compensation pattern 230 may be formed of the same material as the light-blocking pattern 220 on the same layer as the light-blocking pattern 220 and may have the same thickness as the light-blocking pattern 220. Accordingly, the concave surface compensation pattern 230 and the light-blocking pattern 220 may be easily fabricated simultaneously by the same process using one mask.

The color filter 240 may be formed on the second substrate 210 having the light-blocking pattern 220 and the concave surface compensation pattern 230. The color filter 240 may be made of an organic film containing dye or pigment that produces each color.

The color filter 240 occupies each pixel region and covers the concave surface compensation pattern 230. The color filter 240 may extend up to the light-blocking pattern 220 located at the boundary of each pixel and may partially overlap the light-blocking pattern 220.

An overcoating layer 250 may be formed on the color filter 240. The overcoating layer 250 may be made of a transparent organic film.

The common electrode 260 may be formed on the overcoating layer 250. The common electrode 260 may be made of a transparent conductive film. Examples of the material that forms the common electrode 260 include, but not limited to, indium tin oxide (ITO) and indium zinc oxide (IZO).

The common electrode 260 may include the aperture 270. The aperture 270 may be located in each pixel. The common electrode 260 forms an electric field in the liquid crystal layer 300, together with the pixel electrode 180. Here, the aperture 270 is a region to which a common voltage cannot be applied directly. Therefore, the electric field is distorted around the aperture 270. The distortion of the electric field divides each pixel into a plurality of domains, thereby improving the response speed of liquid crystals and the viewing angle.

For example, a vertical electric field may be generated between the common electrode 260 and the pixel electrode 180 in a region where the aperture 270 is not located. However, an electric field with a slight slope with respect to the vertical direction may be generated in the region where the aperture 270 is located. Liquid crystal molecules with negative dielectric anisotropy tend to slope in a direction perpendicular to the direction of an electric field. However, in the case of liquid crystal molecules which are initially aligned vertically, there is no tendency to rotate to the left or to the right of the drawings. Therefore, adjacent liquid crystal molecules may rotate in opposite directions. In this case, the liquid crystal molecules may collide with each other, thus increasing the time required to align the liquid crystal molecules at a desired angle.

In contrast, if the electric field slopes as described above, the liquid crystal molecules may have a tendency to move in a certain direction. Accordingly, the liquid crystal molecules may rotate rapidly in the certain direction. When liquid crystal molecules on one side rotate rapidly in the certain direction, the force of rotation is physically transferred to other adjacent liquid crystal molecules. This increases the rotation response speed of the liquid crystal molecules in the region where the aperture 270 is not formed.

When seen in a plane view, the liquid crystal molecules may rotate at 360 degrees with respect to the aperture 270. Therefore, the overall viewing angle can be improved.

The region where the aperture 270 is formed is an empty space without an electrode material layer. If the common electrode 260 has a uniform thickness and is stacked on the flat overcoating layer 250, the aperture 270 may form a concave groove. However, a concave groove formed in a surface of the second display substrate 200 may hinder the space between the first display substrate 100 and the second display substrate 200 from being evenly filled with liquid crystal molecules.

Specifically, liquid crystals may be evenly dropped on the first display substrate 100 or the second display substrate 200 to form the liquid crystal layer 300. The dropped liquid crystals may form a plurality of clusters. For distribution of the liquid crystals, the second display substrate 200 or the first display substrate 100 is placed to face the first display substrate 100 or the second display substrate 200 and then pressed toward the first display substrate 100 or the second display substrate 200. The pressure applied here causes the clusters of the liquid crystals to spread. However, if a concave groove is formed in the surface of the second display substrate 200, since the portion with the concave groove has a larger volume than other portions, it may take longer to fill the concave groove with the liquid crystals. Further, the concave groove may serve as resistance that hinders the liquid crystals from being evenly spread to other regions beyond the aperture 270. Therefore, even if sufficient time passes, the liquid crystals may not spread evenly throughout the display apparatus 500, resulting in a liquid crystal filling defect.

In contrast, according to exemplary embodiments, at least a portion of the overcoating layer 250 protrudes into the aperture 270 of the common electrode 260. The protruding portion of the overcoating layer 250 fills a concave groove that may be formed in the surface by the aperture 270 or reduces a depth of the concave groove. Therefore, since a resistance to liquid crystal filling is reduced, the space between the first and second display substrates 100 and 200 may be substantially evenly filled and/or evenly filled with liquid crystal molecules.

Figure 6:
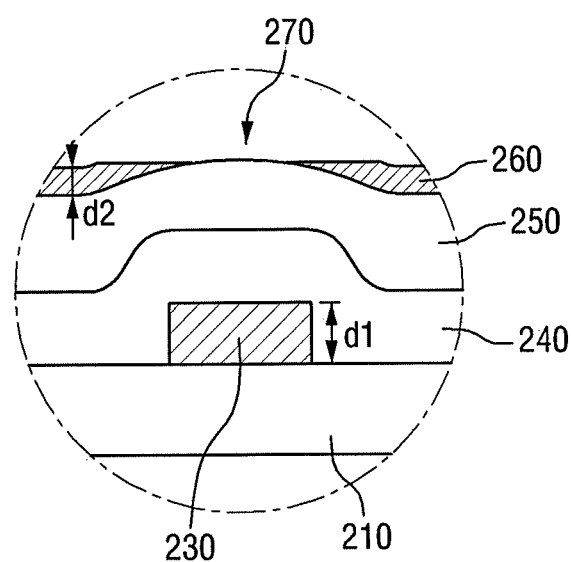
FIG. 6 is an enlarged view of a region A shown in FIG. 5.

The degree to which the overcoating layer 250 protrudes will now be described in more detail with reference to FIG. 6. FIG. 6 is an enlarged view of a region A shown in FIG. 5. In FIG. 6, relative thicknesses and heights of elements are exaggerated for easier understanding.

Referring to FIG. 6, the concave surface compensation pattern 230 formed on the second substrate 210 is covered with the color filter 240 and the overcoating layer 250. If the color filter 240 and the overcoating layer 250 have uniform thicknesses in all regions, a surface profile composed of the second substrate 210 and the concave surface compensation pattern 230 may be transferred as it is to a surface of the color filter 240 and a surface of the overcoating layer 250. Accordingly, a height of the color filter 240 and a height of the overcoating layer 250 from the surface of the second substrate 210, in a region where the concave surface compensation pattern 230 is formed, are greater than a height of the color filter 240 and a height of the overcoating layer 250, in a region where the concave surface compensation pattern 230 is not formed, by a thickness d1 of the concave surface compensation pattern 230. Since the concave surface compensation pattern 230 overlaps the aperture 270 of the common electrode 260 as described above, the overcoating layer 250 may protrude toward the aperture 270 by a distance equal to the thickness d1 of the concave surface compensation pattern 230.

If the overcoating layer 250 protrudes a distance equal to a thickness d2 of the common electrode 260, the protruding surface of the overcoating layer 250 may be at the same height from the surface of the second substrate 210 as a surface of the common electrode 260. Therefore, a concave groove formed by the aperture 270 of the common electrode 260 may be completely filled, thus making the whole surface flat.

Even if the overcoating layer 250 protrudes a distance smaller than the thickness d2 of the common electrode 260, the depth of the concave groove can be at least reduced. Therefore, this contributes to the uniform filling of the space between the first and second display substrates 100 and 200 with liquid crystal molecules.

If the overcoating layer 250 protrudes a distance greater than the thickness d2 of the common electrode 260, a convex surface may be formed in the aperture 270 of the common electrode 260. The convex surface formed in the surface of the second display substrate 200 may serve as a relatively smaller resistance to liquid crystal molecule filling than the concave groove or may hardly serve as a resistance. Therefore, this contributes to the uniform filling of the space between the first and second display substrates 100 and 200 with liquid crystal molecules.

Assuming that the color filter 240 and the overcoating layer 250 have uniform thicknesses in all regions, the degree to which the overcoating layer 250 protrudes entirely depends on the thickness d1 of the concave surface compensation pattern 230. However, depending on a coating method of the color filter 240 or the overcoating layer 250, a surface profile of a structure under the color filter 240 or the overcoating layer 250 may not be transferred as it is but may be softened and then transferred.

For example, the overcoating layer 250 may be formed using a spin coating method. In this case, the profile of the structure under the overcoating layer 250 can be softened by approximately 50%. Accordingly, the degree to which the overcoating layer 250 protrudes in the aperture 270 of the common electrode 260 may be 50% of the thickness d1 of the concave surface compensation pattern 230. For example, if the concave surface compensation pattern 230 is formed of the same material as the light-blocking pattern 220 to a thickness of 1 μm, the overcoating layer 250 may protrude approximately 0.5 μm. If the thickness d2 of the common electrode 260 is approximately 0.045 to 0.135 μm, the surface of the overcoating layer 250 may protrude approximately 0.455 to 0.365 μm further than the surface of the common electrode 260 in the aperture 270 of the common electrode 260. However, the current embodiment is not limited to the above example values.

Therefore, it can be understood that a concave groove formed by the aperture 270 can be removed or its depth can be reduced by adjusting the thickness d2 of the common electrode 260 and the thickness d1 of the groove concave compensation pattern 230.

In some embodiments, the overcoating layer 250 may protrude not only in the aperture 270 of the common electrode 260 but also in part of the common electrode 260 which is adjacent to the aperture 270. In this case, the surface of the common electrode 260 may slope up toward the aperture 270.

When the concave surface compensation pattern 230 is made of the same material as the light-blocking pattern 220, light from a backlight cannot reach the aperture 270 overlapped by the concave surface compensation pattern 230. As described above, an electric field is partially distorted in the aperture 270 of the common electrode 260. Thus, liquid crystal molecules may be aligned at different angles within the same pixel. In this case, the display apparatus 500 may not be able to display black since part of the light from the backlight is leaked through the aperture 270 of the common electrode 260. However, if the concave surface compensation pattern 230 is made of a light-blocking material to completely block the light from the backlight, this phenomenon may be prevented.

Hereinafter, other exemplary embodiments will be described. In the following embodiments, a description of elements substantially the same as those of the previous embodiment described above will be omitted or simplified.

Figure 7:
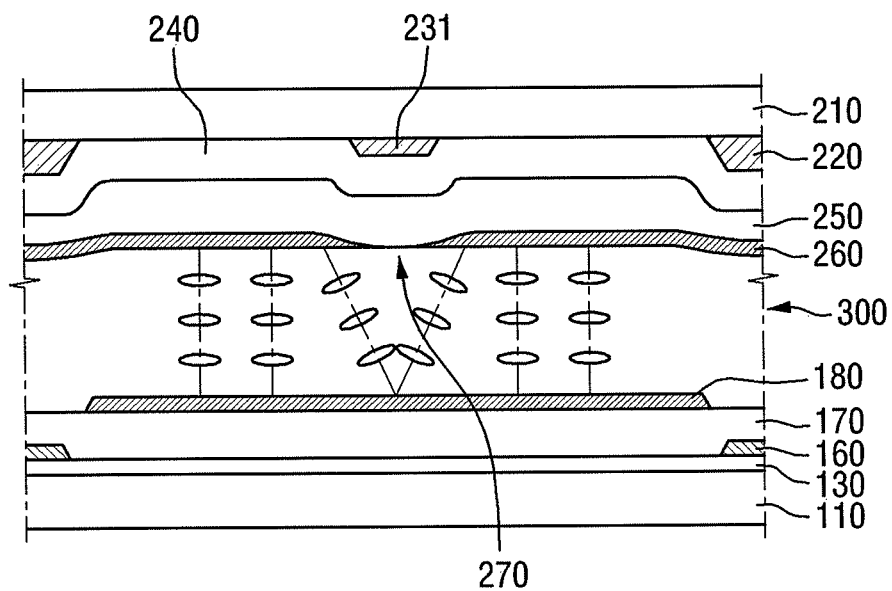
FIG. 7 is a cross-sectional view of a display apparatus according to an exemplary embodiment.

FIG. 7 is a cross-sectional view of a display apparatus 501 according to another exemplary embodiment. Referring to FIG. 7, the display apparatus 501 is different from the embodiment of FIG. 5 in that a thickness of a concave surface compensation pattern 231 is different from a thickness of a light-blocking pattern 220.

The light-blocking pattern 220 may have a thickness sufficient to reduce the possibility of and/or prevent the leakage of light at boundaries of each pixel. The concave surface compensation pattern 231 may have a thickness sufficient to fill an aperture 270 of a common electrode 260. Therefore, the thickness of each of the light-blocking pattern 220 and the concave surface compensation pattern 231 may be varied as desired. When the light-blocking pattern 220 and the concave surface compensation pattern 231 are formed of different materials by different processes, their thicknesses may be easily determined and controlled in the respective processes. On the other hand, when the light-blocking pattern 220 and the concave surface compensation pattern 231 are formed of the same material by the same process, they may be formed to different thicknesses using a slit mask or a semi-transmissive mask. A fabrication method using a slit mask or a semi-transmissive mask is known to those of ordinary skill in the art, and thus a detailed description thereof will be omitted.

Figure 8:
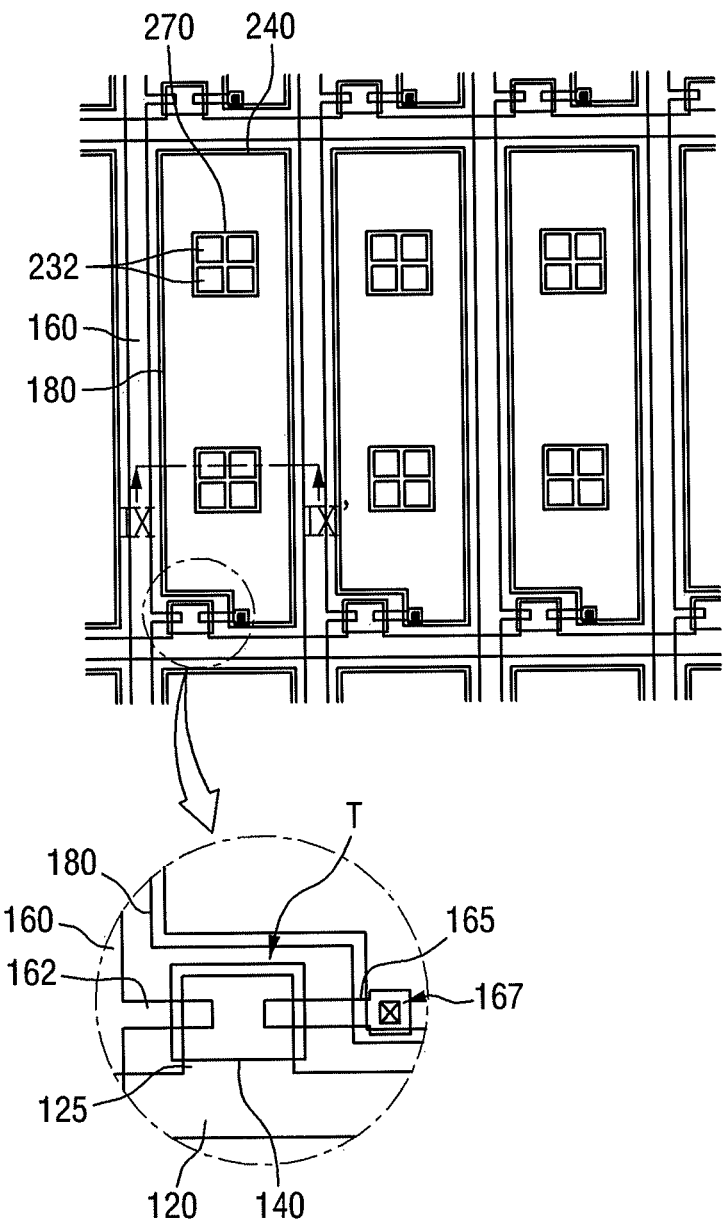
FIG. 8 is a layout view of a second display substrate of a display apparatus according to an exemplary embodiment.
Figure 9:
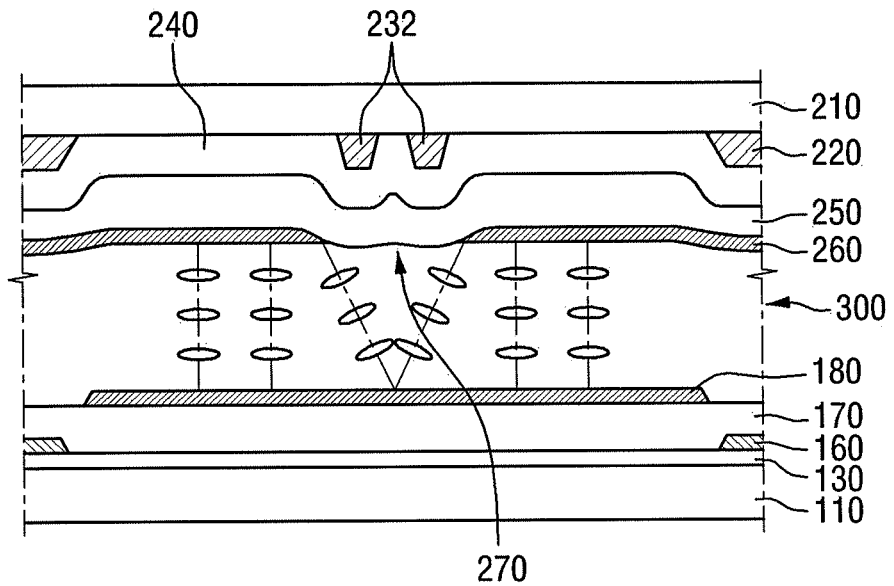
FIG. 9 is a cross-sectional view of the display apparatus shown in FIG. 8.

FIG. 8 is a layout view of a display apparatus 502 according to an exemplary embodiment. FIG. 9 is a cross-sectional view of the display apparatus 502 shown in FIG. 8. Referring to FIGS. 8 and 9, the display apparatus 502 is different from the embodiment of FIG. 5 in that a concave surface compensation pattern is divided into subpatterns.

For example, the concave surface compensation pattern may include a plurality of concave surface compensation subpatterns 232. In the drawings, four concave surface compensation subpatterns 232 that overlap one aperture 270 of a common electrode 260 are illustrated.

If a color filter 240 and an overcoating layer 250 formed on the concave surface compensation subpatterns 232 have uniform thicknesses in all regions, a surface profile composed of a second substrate 210 and the concave surface compensation subpatterns 232 may be transferred to a surface of the overcoating layer 250. In this case, the surface of the overcoating layer 250 may include a plurality of protrusions and recesses in the aperture 270 of the common electrode 260. Here, while a depth of a concave groove is not reduced in the recesses, a width of the concave groove may be significantly reduced compared with a width of the entire aperture 270. Therefore, this may reduce the resistance to liquid crystal filling.

If a surface profile of a structure under the color filter 240 or the overcoating layer 250 is softened and then transferred to the color filter 240 or the overcoating layer 250, the difference in height between the protrusions and recesses of the surface of the overcoating layer 250 in the aperture 270 of the common electrode 260 may be reduced relatively. That is, since the height of the protrusions and the depth of the concave groove in the recesses can be reduced, the resistance to liquid crystal filling can be reduced further.

Figure 10:
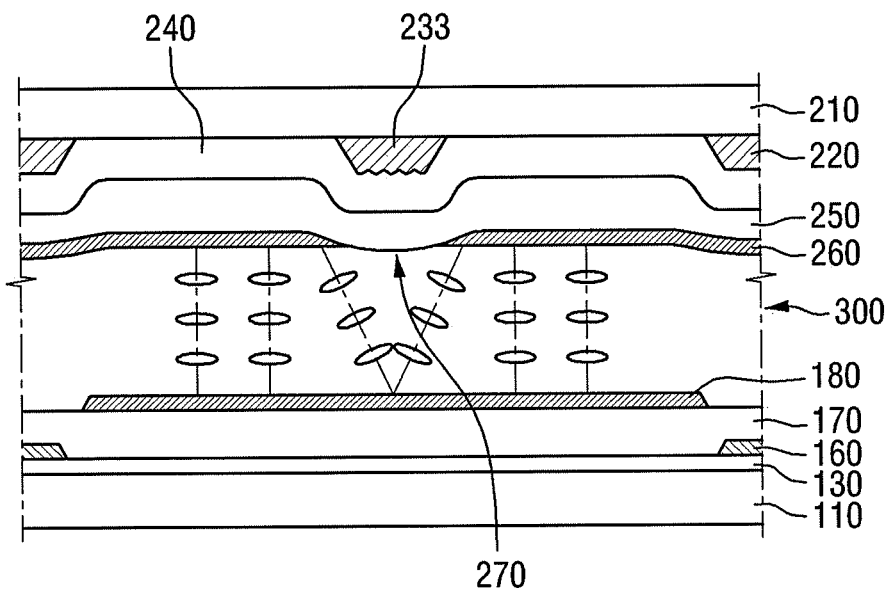
FIG. 10 is a cross-sectional view of a display apparatus according to an exemplary embodiment.

FIG. 10 is a cross-sectional view of a display apparatus 503 according to another exemplary embodiment. Referring to FIG. 10, the display apparatus 503 is different from the embodiment of FIG. 5 in that a surface of a concave surface compensation pattern 233 has protrusions and recesses.

Since a surface profile of the concave surface compensation pattern 233 is transferred to a surface of an overcoating layer 250, the surface of the overcoating layer 250 in an aperture 270 of a common electrode 260 may also have protrusions and recesses. Even if the recesses of the concave surface compensation pattern 233 are transferred to the surface of the overcoating layer 250, a depth of a concave groove is reduced compared with when the concave surface compensation pattern 233 is not formed. If a surface profile of a structure under a color filter 240 or the overcoating layer 250 is softened and then transferred to the color filter 240 or the overcoating layer 250, the difference in height between the protrusions and recesses of the surface of the overcoating layer 250 may be reduced further.

Since the surface of the concave surface compensation pattern 230 according to the current embodiment includes the protrusions and recesses, the concave surface compensation pattern 230 has a different thickness in each region thereof. Such a pattern with different thicknesses can be fabricated by a process using a slit mask or a semi-transmissive mask known to those of ordinary skill in the art.

Figure 11:
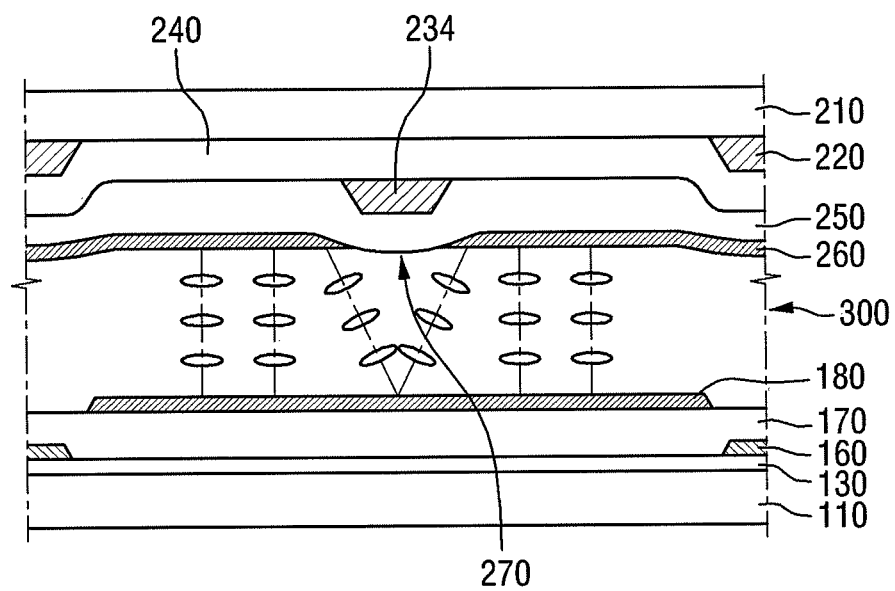
FIG. 11 is a cross-sectional view of a display apparatus according to an exemplary embodiment.

FIG. 11 is a cross-sectional view of a display apparatus 504 according to an exemplary embodiment. Referring to FIG. 11, in the display apparatus 504 according to the current embodiment, a concave surface compensation pattern 234 is formed not directly on a second substrate 210 but is formed directly on another layer.

For example, a light-blocking pattern 220 and a color filter 240 are formed on the second substrate 210, and the concave surface compensation pattern 234 may be formed on the color filter 240 at a location that overlaps an aperture 270 of a common electrode 260. In this case, the color filter 240 may have a flat surface profile in the aperture 270 of the common electrode 260, but an overcoating layer 250 may still protrude due to the effect of the concave surface compensation pattern 234. Although not shown in the drawing, the concave surface compensation pattern 234 may also be formed directly on the overcoating layer 250.

Figure 12:
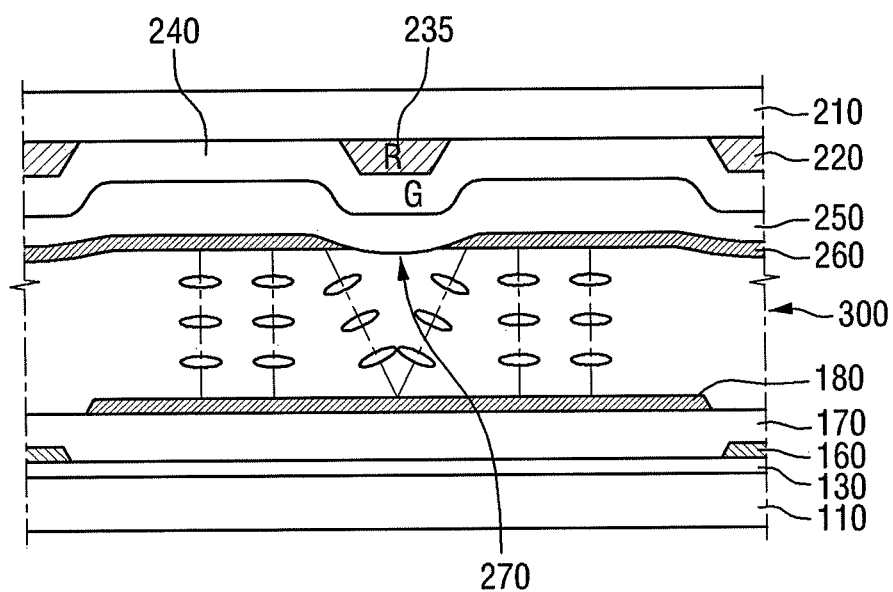
FIG. 12 is a cross-sectional view of a display apparatus according to an exemplary embodiment.
Figure 13:
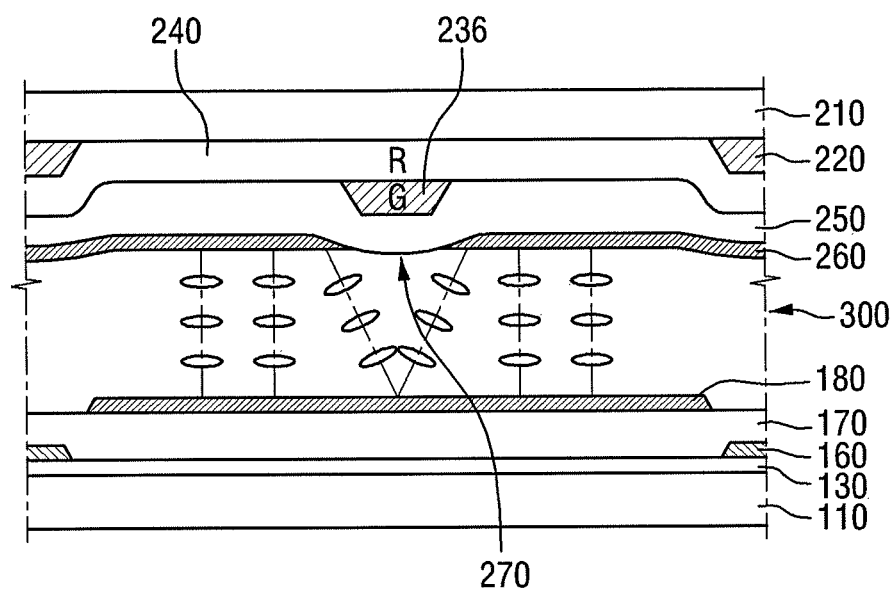
FIG. 13 is a cross-sectional view of a display apparatus according to an exemplary embodiment.

FIGS. 12 and 13 are cross-sectional views of display apparatuses 505 and 506 according to other exemplary embodiments. The display apparatus 505 of FIG. 12 is different from the embodiment of FIG. 5 in that a concave surface compensation pattern 235 is made of substantially the same material as a color filter 240 although its color is different from that of the color filter 240. Also, the display apparatus 506 of FIG. 13 is different from the embodiment of FIG. 11 in that a concave surface compensation pattern 236 is made of substantially the same material as a color filter 240 although its color is different from that of the color filter 240.

In the above structures, a concave groove that may be formed by an aperture 270 of a common electrode 260 can also be removed, or a depth of the concave groove can also be reduced. A color filter used as a concave surface compensation pattern may be of a different type from the color filter 240 in each pixel. For example, a concave surface compensation pattern disposed on or under a red filter may be made of a blue filter material or a green filter material. In this case, when seen from the aperture 270 of the common electrode 260, the color filters with two different colors overlap each other. When color filters with different colors overlap each other, light transmittance is reduced. Thus, the above structure may give a light-blocking effect to the aperture 270 of the common electrode 260.

The embodiments of FIGS. 12 and 13 can be combined with each other. For example, it may be assumed that red, green and blue filters are formed sequentially in separate processes. In this case, in a red filter region, the red filter may be formed using a conventional method. However, in a green or blue filter region, the red filter may be formed only in a region corresponding to the aperture 270 of the common electrode 260. Then, the green or blue filter may be formed in the green or blue filter region using a conventional method but may be formed only in a region of the red filter region which corresponds to the aperture 270 of the common electrode 260. When the red, green and blue filters are formed as described above, the red filter region may have substantially the same structure as the embodiment of FIG. 13, and the green and blue filter regions may have substantially the same structure as FIG. 12.

Figure 14:
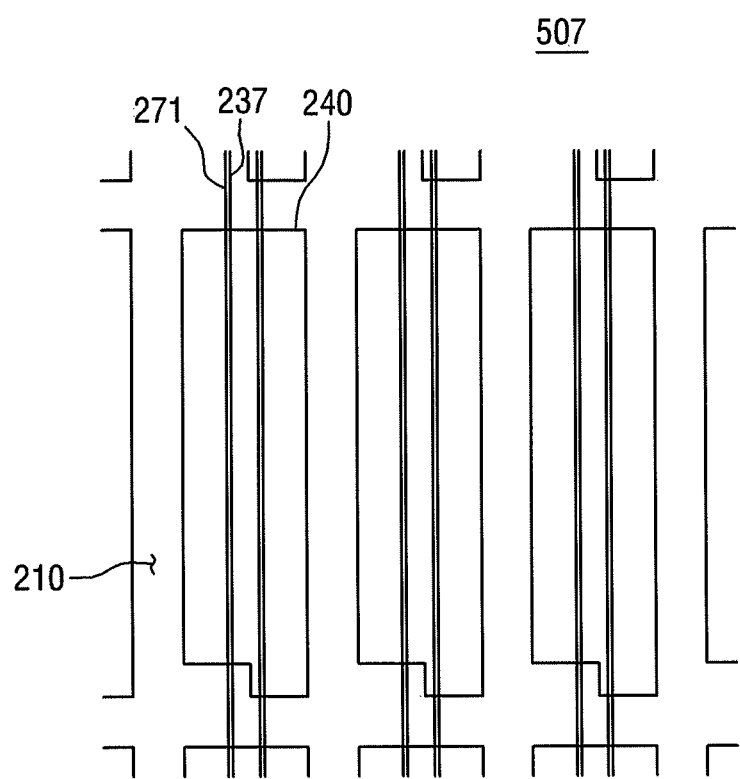
FIG. 14 is a layout view of a second display substrate of a display apparatus according to an exemplary embodiment.

FIG. 14 is a layout view of a display apparatus 507 according to an exemplary embodiment. Referring to FIG. 14, in the display apparatus 507, each aperture 271 of a common electrode is not island-shaped but is linear. When each aperture 271 of the common electrode is formed linearly, a domain may be divided by the aperture 271. A concave surface compensation pattern 237 may also be formed linearly according to the pattern of each aperture 271 of the common electrode. For example, the apertures of the common electrode may be a plurality of slits. In this case, the concave surface compensation patterns may have a shape corresponding to the shape of the apertures.

The above-described embodiments are all exemplary, and different embodiments can be combined.

Embodiments of the present invention may provide at least one of the following advantages. For example, at least a portion of an overcoating layer protrudes upward or downward into an aperture within a common electrode. The protruding portion of the overcoating layer fills a concave groove that may be formed in the surface by the aperture or reduces a depth of the concave groove. Further, a resistance to liquid crystal filling is reduced by way of the arrangement of the overcoating layer and the space between display substrates may be evenly filled with liquid crystal molecules.

According to some embodiments, light is completely blocked from reaching the aperture within the common electrode. Therefore, black may be displayed without being affected by the distortion of an electric field.

The effects of the embodiments are not restricted to the ones set forth herein. The above and other effects will become more apparent to one of ordinary skill in the art.

By way of summation and review, conventionally LCDs may be inadequate for displaying moving images with rapid image changes due to relatively slow response characteristics of liquid crystals. In addition, due to refractive anisotropy of the liquid crystals, the LCDs have poorer viewing angle characteristics than other display apparatuses. However, with the introduction of technologies for dividing a pixel into a plurality of domains, the liquid crystal response speed and viewing angle are improving significantly. One representative method of dividing a pixel into a plurality of domains is to distort an electric field by forming an aperture in a common electrode or a pixel electrode.

To form a liquid crystal layer, liquid crystals are dropped, e.g., evenly dropped, on a first display substrate or a second display substrate. The dropped liquid crystals may form a plurality of clusters. For uniform distribution of the liquid crystals, the second display substrate or the first display substrate is placed to face the first display substrate or the second display substrate and then pressed toward the first display substrate or the second display substrate. The pressure applied here causes the clusters of the liquid crystals to spread.

When an aperture is formed in a common electrode, a concave groove may be formed in the region of the aperture. As described above, to form a liquid crystal layer, liquid crystals may be dropped on a first display substrate, and the first display substrate may be pressed toward a second display substrate such that liquid crystal molecules may be distributed. In this case, the concave groove formed in the surface of the first display substrate may serve as resistance to the distribution of the liquid crystals, thereby hindering the space between the first and second display substrates from being evenly filled with the liquid crystals.

In contrast, embodiments relate to a display apparatus and to a display apparatus including a liquid crystal layer interposed between display substrates having a reduced resistance to during the filling of the liquid crystal molecules. Further, aspects of the embodiments are not restricted to the one set forth herein. The above and other aspects of the embodiments will become more apparent to one of ordinary skill in the art by referencing the detailed description.

While embodiments have been particularly shown and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display apparatus, comprising:
    a first substrate including a pixel electrode; and
    a second substrate facing the first substrate and including a pixel region, the second substrate including:
        an insulating substrate,
        a concave surface compensation pattern that is in the pixel region and that is on the insulating substrate,
        an overcoating layer covering the concave surface compensation pattern, and
        a common electrode that is on the overcoating layer, that is separated from the concave surface compensation pattern by the overcoating layer, and that has an aperture therein at a location corresponding to the concave surface compensation pattern.

2. The display apparatus of claim 1, wherein the concave surface compensation pattern has substantially a same shape as the aperture.

3. The display apparatus of claim 1, wherein a surface of the overcoating layer protrudes through the aperture.

4. The display apparatus of claim 3, wherein a surface of the concave surface compensation pattern includes protrusions and recesses.

5. The display apparatus of claim 1, further comprising a light-blocking pattern arranged on the insulating substrate and arranged along boundaries of the pixel region.

6. The display apparatus of claim 5, wherein the concave surface compensation pattern has substantially a same thickness as the light-blocking pattern.

7. The display apparatus of claim 1, wherein the concave surface compensation pattern includes a plurality of concave surface compensation sub-patterns that are separated from each other.

8. The display apparatus of claim 1, wherein the concave surface compensation pattern is an island-shaped pattern.

9. The display apparatus of claim 1, wherein a surface of the overcoating layer is exposed through the aperture and the surface includes an uneven portion.

10. The display apparatus of claim 1, further comprising a color filter that is in the pixel region and that covers the concave surface compensation pattern, the overcoating layer being on the color filter.

11. The display apparatus of claim 10, wherein the concave surface compensation pattern is made of a color filter material having a different color from a color of the color filter in the pixel region.

12. The display apparatus of claim 1, further comprising a color filter that is in the pixel region and that is interposed between the insulating substrate and the concave surface compensation pattern.

13. The display apparatus of claim 12, wherein the concave surface compensation pattern is made of a color filter material having a different color from a color of the color filter in the pixel region.

14. The display apparatus of claim 1, wherein the common electrode is sloped toward the aperture.

15. The display apparatus of claim 1, further comprising a liquid crystal layer between the first substrate and the second substrate.

16. A display apparatus, comprising:
    a first substrate including a pixel electrode;
    a second substrate facing the first substrate and including a pixel region; and
    a liquid crystal layer between the first substrate and the second substrate,
    wherein the second substrate includes:
        an insulating substrate,
        a first light-blocking pattern arranged on the insulating substrate and arranged along boundaries of the pixel region,
        a second light-blocking pattern that is in the pixel region and that is on the insulating substrate,
        a color filter that is in the pixel region and that covers the second light-blocking pattern,
        an overcoating layer on the color filter, and
        a common electrode that is on the overcoating layer and that has an aperture therein at a location corresponding to the second light-blocking pattern.

17. The display apparatus of claim 16, wherein the second light-blocking pattern has substantially a same shape as the aperture.

18. The display apparatus of claim 16, wherein a surface of the overcoating layer protrudes through the aperture.

19. The display apparatus of claim 16, wherein the first light-blocking pattern and the second light-blocking pattern are simultaneously patterned structures formed in a same process.

20. The display apparatus of claim 16, wherein the first light-blocking pattern and the second light-blocking pattern have substantially a same thickness.

21. The display apparatus of claim 16, wherein the common electrode is sloped toward the aperture.

22. A display apparatus, comprising:
a first substrate including a pixel electrode; and
a second substrate facing the first substrate and including a pixel region, the second substrate including:
an insulating substrate,
a concave surface compensation pattern that is in the pixel region and that is on the insulating substrate,
an overcoating layer covering the concave surface compensation pattern, and
a common electrode that is on the overcoating layer and that has an aperture therein at a location corresponding to the concave surface compensation pattern,
wherein a surface of the overcoating layer protrudes through the aperture, and
wherein the surface of the overcoating layer protruding through the aperture protrudes farther than a surface of the common electrode defining the aperture.

* * * * *